(12) United States Patent
Davis et al.

(10) Patent No.: US 7,123,611 B2
(45) Date of Patent: Oct. 17, 2006

(54) PACKET SWITCHING

(75) Inventors: Simon Paul Davis, Romsey (GB); Andrew Reeve, Winchester (GB)

(73) Assignee: Roke Manor Research Limited, Romsey (GB)

( * ) Notice: Subject to any disclaimer, the term of this patent is extended or adjusted under 35 U.S.C. 154(b) by 809 days.

(21) Appl. No.: 09/864,870

(22) Filed: May 25, 2001

(65) Prior Publication Data

US 2002/0051451 A1    May 2, 2002

(30) Foreign Application Priority Data

May 25, 2000  (GB) ................................ 0012611.0
Oct. 6, 2000  (GB) ................................ 0024463.2

(51) Int. Cl.
*H04L 12/56* (2006.01)
(52) U.S. Cl. ...................................... 370/387; 370/390
(58) Field of Classification Search ........ 370/229–235, 370/389, 395.4–395.71, 397–399, 409–419
See application file for complete search history.

(56) References Cited

U.S. PATENT DOCUMENTS

| | | | | |
|---|---|---|---|---|
| 5,361,256 A | * | 11/1994 | Doeringer et al. | 370/390 |
| 5,898,686 A | * | 4/1999 | Virgile | 370/381 |
| 5,963,552 A | * | 10/1999 | Joo et al. | 370/395.32 |
| 6,011,782 A | * | 1/2000 | DeSimone et al. | 370/260 |
| 6,347,090 B1 | * | 2/2002 | Ooms et al. | 370/428 |
| 6,490,285 B1 | * | 12/2002 | Lee et al. | 370/395.31 |
| 6,600,743 B1 | * | 7/2003 | Lee et al. | 370/390 |
| 6,654,343 B1 | * | 11/2003 | Brandis et al. | 370/229 |
| 6,707,824 B1 | * | 3/2004 | Achilles et al. | 370/412 |
| 6,747,971 B1 | * | 6/2004 | Hughes et al. | 370/387 |
| 6,757,246 B1 | * | 6/2004 | Alasti et al. | 370/230 |
| 6,795,433 B1 | * | 9/2004 | Li | 370/389 |

(Continued)

FOREIGN PATENT DOCUMENTS

EP    1052804    11/2000

OTHER PUBLICATIONS

Huang et al: "A High-Performance Input Access Scheme for ATM Mutlicast Switching"; 1996 IEEE International Conference on Communications (ICFC); Converging Technologies for Tomorrow's Applications. Dallas, Jun. 23-27, 1996, IEEE International Conference on Communications (ICC), New York, IEE, US, vol. 2, Jun. 23, 1996, pp. 1035-1039, XP000625929.

(Continued)

*Primary Examiner*—Khanh Dinh
*Assistant Examiner*—Van Nguyen
(74) *Attorney, Agent, or Firm*—Crowell & Moring LLP

(57) ABSTRACT

In a method for cell level scheduling for handling multicast traffic in routing devices, such as cross-bar switches having, a plurality of ingress line interface cards (LICs), a plurality of egress LICs, a cross-bar and a controller, multicast and unicast data traffic passes from the ingress LICs via the cross-bar to the egress LICs. A given multicast data packet is sent from a given ingress LIC to a predetermined set of egress LICs known as the fanout of the given packet. Each ingress LIC has an associated rate of send opportunities. The method allows multicast send opportunities to be spread as evenly as possible over cell periods, by invoking a conventional unicast scheduling scheme when one or more multicast send opportunities are present. The schedule is filled out with the fanouts of multicast packets in accordance with the send priority associated with the respective ingress LICs upon which each of the respective multicast packets is queued.

13 Claims, 2 Drawing Sheets

U.S. PATENT DOCUMENTS 6,804,731 B1 * 10/2004 Chang et al. ................. 710/53

OTHER PUBLICATIONS

McKeown et al; "Tiny Tera: A Packet Switch Core"; IEEE Micro, IEEE Inc. New York, US, vol. 17, No. 1, 1997, pp. 26-33, XP000642693.

Schultz et al: "Multicast Contention Resolution with Single-Cycle Windowing Using Content Addressable FIFO'S"; IEEE / ACM Transactions on Networking, IEEE Inc. New York, US, vol. 4, No. 5, Oct. 1, 1996, pp. 731-741, XP000631086.

Chen et al: "Access Control in Multicast Packet Switching" IEEE / ACM Transactions on Networking, IEEE Inc. New York, US, vol. 1, No. 6, Dec. 1, 1993, pp. 638-649, XP000430134.

Min et al: "Nonblocking Copy Networks in Multi-Channel Switching" IEEE / ACM Transactions on Networking, IEEE Inc. New York, US, vol. 3, No. 6, Dec. 1, 1995, pp. 857-871, XP000544188.

Turner: "An Optimal Nonblocking Multicast Virtual Circuit Switch"; Proceedings of the Conference on Computer Communications (INFOCOM). Toronto, Jun. 12-16, 1994, Los Alamitos, IEEE Comp. Soc. Press, US, vol. 1, Jun. 12, 1994, pp. 298-305, XP000496480.

* cited by examiner

*Fig. 2a*

Multicast Cell Fanout Table

*Fig. 2b*

Multicast Egress Credit

*Fig. 2c*

Eligible

*Fig. 2d*

Compile Control Frame

PACKET SWITCHING

The present invention relates to improvements in or relating to packet switches, and is more particularly concerned with cross-bar switches having a cell-level scheduling scheme for handling multicast traffic therein.

BACKGROUND OF THE INVENTION

Data is transferred over the Internet by means of a plurality of packet switches in accordance with a standard protocol known as Internet Protocol (IP). IP is a protocol based on the transfer of data in variable sized portions known as packets. All Internet traffic involves the transportation of packets of data. Packet switches are devices for accepting incoming packets; temporarily storing each packet; and then forwarding the packets to another part of the network. In particular, a packet switch receives packets of data on a plurality of input ports and transfers each packet to a specific one of a plurality of output ports. The packets of data can be of variable length or of fixed length.

Traffic volume in the Internet is growing exponentially, almost doubling every 3 months. The current capacity of internet protocol (IP) routers or packet switches is insufficient to meet this demand and hence there is a need for IP routers that can route IP traffic at extremely large aggregate bandwidths in the order of several Terabit/s. Such routers are termed "Terabit Routers".

Two important trends are also evident. First, operators are consolidating all traffic onto a single IP back-bone. Secondly, IP is increasingly required to support real-time and multimedia traffic. This means that the next generation of routers must also support 'Quality of Service' (QoS). In particular, they must support low bounded delay for real-time traffic.

The packets transferred in accordance with IP can (and do) vary in size. Within routers it has been found useful to pass data in fixed sized units. In routers the data packets are partitioned into small fixed sized units, known as cells.

One suitable technique for implementing a scalable communications path is a backplane device, known as a cell based cross-bar. Data packets are partitioned into cells by a plurality of ingress means for passage across the cross-bar.

The plurality of ingress means provide respective interfaces between incoming communications channels carrying incoming data and the backplane. Similarly, a plurality of egress means provide respective interfaces between the backplane and outgoing communications channels carrying outgoing data.

A general terabit router architecture bears some similarity to conventional router architecture. Packets of data arrive at input port(s) of ingress means and are routed as cells across the cross-bar to a predetermined egress means which reassembles the packets and transmits them across its output port(s). Each ingress means maintains a separate packet queue for each egress means.

The ingress and egress means may be implemented as line interface cards (LICs). Since one of the functions regularly undertaken by the ingress and egress means is forwarding, LICs may also be known as 'forwarders'. Further functions include congestion control and maintenance of external interfaces, input ports and output ports.

In a conventional cell based cross-bar each ingress means is connected to one or more of the egress means. However, each ingress means is only capable of connecting to one egress means at any one time. Likewise, each egress means is only capable of connecting to one ingress means at a time.

All ingress means transmit in parallel and independently across the cross-bar. Furthermore cell transmission is synchronised with a cell cycle, having a period of, for example, 108.8 ns.

The ingress means simultaneously each transmit a new cell with each new cell cycle.

The pattern of transmissions from the ingress means across the cross-bar to the egress means changes at the end of every cell cycle.

The co-ordination of the transmission and reception of cells is performed by a cross-bar controller.

A cross-bar controller is provided for efficient allocation of the bandwidth across the cross-bar. It calculates the rates that each ingress means must transmit to each egress means. To support multicast traffic, it is also necessary to calculate the multicast rates from ingress means to all relevant egress means. This is the same as the rate at which data must be transmitted from each packet queue. The calculation makes use of real-time information, including traffic measurements and indications from the ingress means. The indications from the ingress means include monitoring the current rates, queue lengths and buffer full flags. The details of the calculation are discussed more rigorously in the copending UK Patent Application Number 9907313.2 (docket number F21558/98P4863).

The cross-bar controller performs a further task; it serves to schedule the transfer of data efficiently across the cross-bar whilst maintaining the calculated rates. At the end of each cell cycle, the cross-bar controller communicates with the ingress and egress means as follows. First, the cross-bar controller calculates and transmits to each ingress means the identity of the next packet queue from which to transmit. Secondly, the cross-bar controller calculates and transmits to each egress means the identity of the ingress from which it must receive.

By allowing many egress means to receive from the same ingress means at the same time, multicast replication can be achieved.

SUMMARY OF THE INVENTION

In accordance with one aspect of the present invention, there is provided a method of operating a packet switch which comprises a plurality of ingress means, a plurality of egress means, a cross-bar and a controller, the cross-bar being connected between the ingress means and the egress means to transfer multicast and unicast data traffic from the ingress means to the egress means, the method comprising the steps of:

a) determining if the data traffic to be transferred is unicast or multicast;

b) if the data traffic is unicast, invoking a unicast schedule;

c) if the traffic is multicast, invoking a multicast schedule; and d) transferring the data traffic in accordance with the invoked schedule.

Advantageously, step c) comprises forming a multicast cell fanout table containing current fanout requirements for a cell at the head of a multicast queue in each ingress means.

Step c) further comprises setting eligible bits for multicast cells which are currently allowed to be scheduled.

Step c) further comprises determining a priority for each ingress means for sending the cells.

The method further comprises the step of e) filling a blank multicast schedule in accordance with the priority assigned to each ingress means.

Step e) comprises the step of:
(i) filling the blank schedule with the full fanout of the first priority ingress means.

Step e) further comprises the step of:
(ii) filling in as much of the fanout of the next priority ingress means and subsequent ingress means as possible to complete the schedule.

Step (ii) comprises selecting fanouts of ingress means in accordance with multicast egress credit allocated to each egress means.

The term 'fanout' as used herein refers to set of egress means to which the current cell must be replicated.

Other objects, advantages and novel features of the present invention will become apparent from the following detailed description of the invention when considered in conjunction with the accompanying drawings.

BRIEF DESCRIPTION OF THE DRAWINGS

FIG. 2 illustrates multicast scheduling.

DETAILED DESCRIPTION OF THE INVENTION

The desired features for a multicast scheme in accordance with the present invention are listed below:
High efficiency (aim for 70–80% pure multicast traffic or better)
Use shared cross-bar for replication
Easily integrated into the unicast cell level scheduling algorithm
Fair across ingress ports to each egress port
Supports real time and non real time multicast services
Maintains unicast bandwidth commitments It is assumed that there is one multicast IP packet (or fixed length part of such a packet) available to be sent at each ingress line interface card (LIC). Although the present invention will be described with reference to LICs, it will readily be appreciated that it is not limited to using LICs and that any suitable device which provide the ingress and egress functions can be used.

The fanout of a multicast packet is defined to be the set of egress ports (of the cross connect) to which the packet must be replicated. The fanout of the next multicast cell must be known by the central scheduler in order that it can be scheduled across the cross connect.

It is assumed that the fanout information for the next multicast cell to be sent from each ingress port is known.

Once ingress bandwidths have been allocated for multicast traffic, scheduling opportunities must be allocated for all ingress LICs to ensure fair access and to preserve allocated rates. The basic scheduling concept for multicast slots is shown in FIG. 1.

Figure 1A:
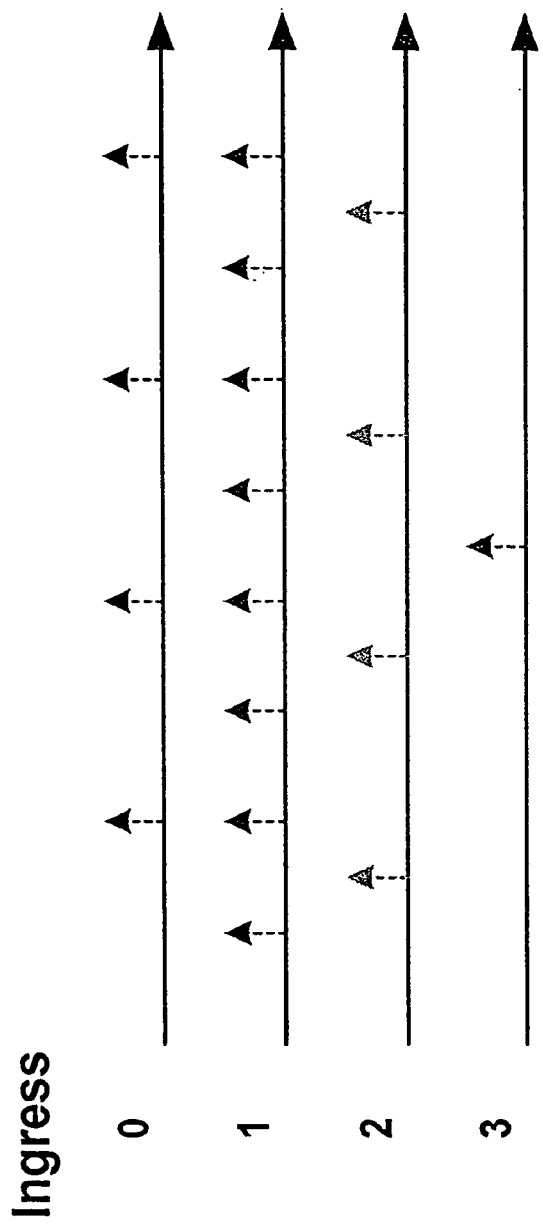
FIGS. 1a and 1b illustrate multicast ingress rate resolution.
Figure 1B:
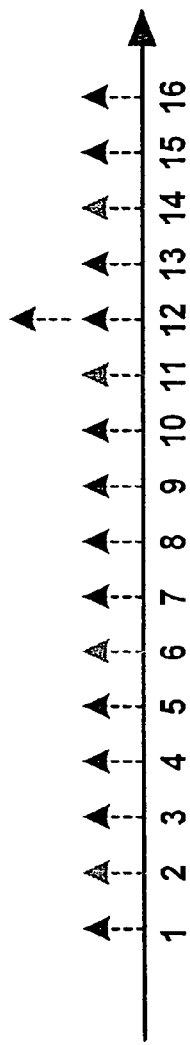

FIG. 1 illustrates separate ingress lines (FIG. 1a) and a multicast schedule (FIG. 1b).

The four ingress lines are labelled 0 to 3 as shown on the left. Each line has a rate associated with multicast traffic, that is, high and low priority queues. This rate is represented as a send opportunity, indicated by the arrows, every fixed number of cell periods. Ingress line 1 has the highest rate in that it provides a send opportunity every two cell periods. Ingress line 0 has a rate which provides a send opportunity every four cell periods. Ingress line 2 has the same rate as ingress line 0 but is out of phase with it by a cell period. Ingress line 3 has the lowest rate—providing a send opportunity every sixteen cell periods.

The send opportunities of ingress lines 0 to 3 as shown in FIG. 1a are combined into a multicast schedule as shown FIG. 1b. In accordance with the present invention, the send opportunities are combined by placing a send opportunity on the next free cell cycle (cell cycles are numbered 1 to 16 as shown) unless it would overlap with the next send opportunity for the same ingress LIC. This means that each ingress has send opportunities as shown in Table 1 below:

TABLE 1

| | Cell cycles | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 0 | | | √ | | | | √ | | | | √ | | | | √ | |
| 1 | √ | | √ | | √ | | √ | | √ | | √ | | √ | | √ | |
| 2 | | √ | | | | √ | | | | √ | | | | √ | | |
| 3 | | | | | | | √ | | | | | | | | | |

However, in order to combine these send opportunities in accordance with the present invention, this means that each ingress will send in the free cell cycles as shown in Table 2:

TABLE 2

| | Cell cycles | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 0 | | | √ | | | √ | | | | | √ | | | | √ | |
| 1 | √ | | √ | √ | | √ | | | √ | | √ | √ | | √ | | |
| 2 | | √ | | | √ | | | | √ | | | | √ | | | |
| 3 | | | | | | | | | | | | | √ | | | √ |

It can readily be seen from Table 2 above and from FIG. 1b that cell period 12 has two send opportunities where the send opportunity for ingress LIC 1 has to be stacked on top of the cell send opportunity for ingress LIC 0 to avoid it colliding with its next send opportunity. This means that, for cell 12, LIC 1 must be transmitted before LIC 0, that is, LIC 1 is first choice and LIC 0 is second choice. It will be appreciated that LIC 1 has to be first choice as it will collide with itself on the next available cell cycle.

The net effect of this process is to spread the multicast send opportunities on as many cell periods as possible thus reducing the height of each stack. The height of each stack is directly related to the number of ingress multicast cells that have to be scheduled in this cycle and thus the amount of sorting that has to be carried out by the algorithm.

Whilst minimising the amount of work to be carried out in each cell cycle by the multicast scheduler, the maximum jitter is also limited to 1/rate. A cell send opportunity is never delayed by more than the gap between the ideal ingress cell send opportunities, thus making the jitter inversely proportional to the rate. Multicast real time delay jitter can thus be improved by allocating higher rates.

If there is no multicast cell send opportunity scheduled, then a normal unicast scheduling algorithm is invoked. If there is one or more multicast cell send opportunities then a multicast scheduling algorithm is invoked in accordance with the present invention.

FIG. 2 shows the active components in the multicast scheduling algorithm. A multicast cell fanout table is shown in FIG. 2a which contains the current fanout requirements for the cell at the head of the multicast queue in each ingress LIC. The table comprises an ordered list of pointers relating to the stack of multicast send opportunities on a particular cell period. The ingress LICs are listed on the left of the table and the egress LICs are listed on the top of the table. As shown, ingress 0 is sending to egresses 0, 2, 4, 6, 8 and 10, ingress 1 is sending to egresses 2, 3, 4, 9 and 10, ingress 3 is sending to egresses 9 and 10, and ingress 6 is sending to egresses 5, 6, 9 and 10.

When the multicast schedule as shown in FIG. 1b is carried out for these specific examples, it is found that ingress 1 is the first choice and ingress 6 is the second choice. This means that ingress 1 has first priority to send a multicast cell followed by ingress 6.

Each egress has a multicast credit as shown in FIG. 2b. The multicast egress credit is determined in accordance with a multicast bandwidth allocation method as described in co-pending British patent application no. 0018328.5 (docket number 2000P04909). The egress credit is the maximum number of multicast cells that can be sent to each egress in one bandwidth allocation period (BAP). A BAP is the number of cell cycles over which the calculated rate remains static, that is, the calculated rate may change ever BAP. As shown in FIG. 2b, egress 0 has a credit of 27, egress 1 has no credit and egresses 2 and 3 have credits of 35 and 5 respectively.

As the algorithm supports the concept of scheduling part of the fanout and leaving residues, the entries in the multicast cell fanout table will change, that is, 1s will go to 0s when they have been scheduled, when part of the fanout has been scheduled. Another table (not shown) is thus required to remember the full fanout for the duration of the packet. This second table, called the multicast packet fanout table, is updated when the next fanout is sent to a traffic management card in the controller at the end of the packet.

The algorithm starts with a blank schedule and fills this with the full fanout of the first choice ingress LIC, as shown on the right of FIG. 2d in the compilation of the control frame. In this case, ingress LIC 1 is the first choice and 1s have been entered in the control frame corresponding to egresses 2, 3, 4, 9 and 10 leaving the remaining positions blank. It then moves to the next ingress LIC of choice and schedules as much of the fanout as possible. In the example illustrated in FIG. 2a, the second choice is ingress LIC 6. In this case, as egress LICs 9 and 10 have been taken up with the fanout for the first choice, only egress LICs 5 and 6 can be added to the control frame. This is shown as 6s in the control frame of FIG. 2e in the positions corresponding to egress LICs 5 and 6.

It will be appreciated that this will be repeated for subsequent choice ingress LICs until the control frame is as full as it can be. For example, if ingress LIC 0 is the third choice, 0s will be added to the control frame to correspond to egress LICs 0 and 8. Ingress LIC 3 cannot add anything to the control frame as the two egress LICs to which it is to multicast are already taken by the first choice ingress LIC, that is, ingress LIC 1. Although ingress LIC 2 has a cell which can be transmitted to egress LIC 1, this cannot be added to the control frame as there is no multicast egress credit as will be described more fully below. A fully compiled control frame for the example shown in FIG. 2 may comprise the following:

|0| |1|1|1|6|6| |0|1|1|

For the multicast cells that are scheduled for this cell period, that is, cells from ingress LICs 1 and 6 in this example, the eligible bits are set. As shown in the 'eligible' status column (FIG. 2c), ingresses 0, 1, 2 and 6 are eligible for multicast as shown by the 1s. Ingress 3 is not eligible for multicast as shown by the 0. These bits are only reset when the cell has been scheduled for the complete fanout. In the example, shown in FIG. 2, only ingress LIC 1 will be reset as that is the only ingress LIC which has been completely scheduled for the whole fanout.

The algorithm will then attempt to schedule as many of the other multicast cells as possible, starting with the one whose ingress LIC number is one larger than the first choice, subject to two constraints. The first is that the eligible bit is set, the second is that the multicast egress credit is positive for a particular egress destination. The attempt to schedule as many other multicast cells as possible is cyclic in nature and once all ingress lines in the multicast cell fanout table have been evaluated for scheduling from the first choice ingress line, the algorithm returns to the top of the fanout table and carries on until all ingress line entries have been evaluated.

Any gaps in the compiled frame can be filled by unicast traffic.

The multicast egress credit is decremented each time a multicast cell is scheduled for that particular egress. In a real implementation there will probably be separate credit for real time multicast cells and for non real time multicast cells. This credit can be refreshed by the equivalent allocated egress rates every BAP period or on a sub-multiple of a BAP period depending on the amount of egress smoothing desired.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of operating a packet switch which comprises a plurality of ingress means, a plurality of egress means, a cross-bar and a controller, the cross-bar being connected between the ingress means and the egress means to transfer multicast and unicast data traffic from the ingress means to the egress means, the method comprising the steps of:
   a) determining if the data traffic to be transferred is unicast or multicast;
   b) if the data traffic is unicast, invoking a unicast schedule;
   c) if the traffic is multicast, invoking a multicast schedule; and
   d) transferring the data traffic in accordance with the invoked schedule; wherein,
   step c) comprises forming a multicast cell fanout table containing current fanout requirements for a cell at the head of a multicast queue in each ingress means, setting eligible bits for multicast cells which are currently allowed to be scheduled, and determining a priority for each ingress means for sending the cells;
   the step of determining the priority for each ingress means is based on a combination of send opportunities of the ingress means;
   the method further comprises a step of e) filling a blank multicast schedule in accordance with the priority assigned to each ingress means;
   step e) comprises (i) filling the blank schedule with the full fanout of the first priority ingress means, and (ii) filling in as much of the fanout of the next priority ingress means and subsequent ingress means as possible to complete the schedule; and
   step (ii) comprises selecting fanouts of ingress means in accordance with multicast egress credit allocated to each egress means.

2. A method of operating a packet switch which comprises a plurality of ingress means, a plurality of egress means, a cross-bar and a controller, the cross-bar being connected between the ingress means and the egress means to transfer multicast and unicast data traffic from the ingress means to the egress means, the method comprising the steps of:
   a) determining if the data traffic to be transferred is unicast or multicast;
   b) if the data traffic is unicast, invoking a unicast schedule;
   c) if the traffic is multicast, invoking a multicast schedule; and
   d) transferring the data traffic in accordance with the invoked schedule; wherein,
   step c) comprises forming a multicast cell fanout table containing current fanout requirements for a cell at the head of a multicast queue in each ingress means, and setting eligible bits for multicast cells which are currently allowed to be scheduled;
   each ingress means has a rate associated with multicast traffic, said rate being represented as a send opportunity every fixed number of cell periods, the send opportunities of the plurality of ingress means being combined into a multicast schedule by placing a send opportunity on the next free cell cycle unless it would overlap with the next send opportunity for the same ingress means; and in the case of a potential such overlap, stacking multiple send opportunities in a single cell cycle; and
   a priority is determined for each ingress means associated with the stacked send priorities, based on the combination of send opportunities in the multicast schedule.

3. A method according to claim 2, further comprising the step of e) filling a blank multicast schedule in accordance with the priority assigned to each ingress means.

4. A method according to claim 3, wherein step e) comprises the step of:
   (i) filling the blank schedule with the full fanout of the first priority ingress means.

5. A method according to claim 4, wherein step e) further comprises the step of:
   (ii) filling in as much of the fanout of the next priority ingress means and subsequent ingress means as possible to complete the schedule.

6. A method according to claim 5, wherein step (ii) comprises selecting fanouts of ingress means in accordance with multicast egress credit allocated to each egress means.

7. A method of operating packet switch comprising a plurality of ingress means, a plurality of egress means, a cross-bar and a controller, the cross-bar being connected between the ingress means and the egress means to transfer multicast and unicast data traffic from the ingress means to the egress means, the method comprising:
   A) for each ingress means, determining whether data traffic to be transferred is unicast or multicast;
   B) if the data traffic is unicast, invoking a unicast schedule;
   C) if the traffic is multicast, invoking a multicast schedule; and
   D) transferring the data traffic in accordance with an invoked schedule;
   wherein step C) further comprises,
      (i) for each ingress means having a multicast cell for transmission to a respective fanout of egress means, assigning a multicast rate, indicated by a periodic multicast send opportunity spaced apart by a number of cell periods, said number being determined in accordance with the allocated multicast rate;
      (ii) combining the multicast send opportunities allocated to the ingress means into a multicast schedule, said multicast schedule being prepared by the following steps,
         (a) for each ingress means, scheduling each allocated multicast send opportunity in a next free cell period unless it would then overlap with the next indicated allocated multicast send opportunity for the same ingress means;
         (b) where two or more ingress means each have an indicated multicast send opportunity in any one cell period, scheduling multicast send opportunities according to an allocated priority of each ingress means, wherein the allocated priority is calculated as follows, for each cell period,
            1. if an ingress means has an indicated periodic multicast send opportunity in a particular cell period, and if delaying that ingress multicast send opportunity by one cell period would result in overlap with the next indicated multicast send opportunity for the same ingress means, allocating that ingress means a high priority;
            2. allocating a lower priority to other ingress means having an indicated multicast send opportunity in the particular cell period;
            3. allocating an even lower priority to other eligible ingress means having a multicast cell to transmit;
         (c) scheduling transmission of an entire fan-out of the multicast cell of any ingress means with high priority during the particular cell period, and scheduling transmission of at least part of a fan-out of a multicast cell of a second ingress means of lower or even lower priority, to egress means which are not included within a fan-out of the high-priority ingress means;

(d) scheduling as large a portion as possible of a fan-out of multicast cells of further ingress means; and (e) maintaining eligibility of any remaining portion of the multicast fanout of the second and further multicast cells for the following cell period.

8. A method according to claim 7, wherein an eligibility bit is provided for each ingress means, the eligibility bit being set to indicate ingress means having multicast cells which are currently allowed to be scheduled.

9. A method according to claim 8, wherein the eligibility bit for a particular ingress means is reset once the entire multicast fanout has been scheduled for the particular ingress means, and the eligibility bit is set when a next indicated multicast send opportunity occurs for that ingress means.

10. A method according to claim 7, wherein step C)(ii) comprises forming a multicast cell fanout table containing current fanout requirements for multicast cells at the head of a multicast queue in each respective ingress means.

11. A method according to claim 10, wherein:

a multicast egress credit is allocated to each egress means; and steps (C)(ii)(c) and (d) comprise selecting fanouts of ingress means in accordance with the multicast egress credit allocated to each egress means.

12. A method according to claim 7, further comprising the step of scheduling one or more unicast transmissions in a cell period, between ingress and egress ports not scheduled for multicast transmission during the cell period.

13. A method according to claim 7, wherein, if no multicast cell send opportunity is scheduled for a given cell period, invoking a unicast schedule for that cell period.

* * * * *